United States Patent [19]
Tonks et al.

[11] Patent Number: 6,121,816
[45] Date of Patent: Sep. 19, 2000

[54] SLAVE CLOCK GENERATION SYSTEM AND METHOD FOR SYNCHRONOUS TELECOMMUNICATIONS NETWORKS

[75] Inventors: David John Tonks; Andrew McKnight, both of Southampton; Jonathan Lamb, Ringwood, all of United Kingdom

[73] Assignee: Semtech Corporation, Newbury Park, Calif.

[21] Appl. No.: 09/298,402

[22] Filed: Apr. 23, 1999

[51] Int. Cl.[7] ........................................................ H03K 3/00
[52] U.S. Cl. .................................. 327/296; 327/2; 327/7; 327/12; 327/144; 327/145; 327/147; 327/150; 327/298; 327/299; 327/407
[58] Field of Search ............................. 327/2, 7, 12, 144, 327/145, 296, 298, 299, 407, 147, 150

[56] References Cited

U.S. PATENT DOCUMENTS

| | | | |
|---|---|---|---|
| 4,562,402 | 12/1985 | Irvin | 327/156 |
| 5,146,585 | 9/1992 | Smith | 713/400 |
| 5,864,252 | 1/1999 | Tran et al. | 327/202 |

*Primary Examiner*—Margaret R. Wambach
*Assistant Examiner*—Cassandra Cox
*Attorney, Agent, or Firm*—Koppel & Jacobs

[57] ABSTRACT

A slave clock generation system and method suitable for use with synchronous telecommunications networks generates one or more slave clocks from a selected reference clock using a direct digital synthesis technique. A multiplexer selects a reference clock from a number of available sources, each of which can be at its own spot frequency, based on a predetermined selection order. Toggle detectors monitor each of the available clock sources, and block the selection of any that are not within a specified frequency range. A local oscillator establishes short-term and long-term measurement periods; the cycles of the selected reference clock are counted over consecutive short-term measurement periods to determine the relative frequency of the selected clock with respect to the frequency of the local oscillator. The cycle counts are fed to a phase-to-clock converter, which produces a slave clock output having a frequency that varies with the relative frequency measured for the selected clock. Rounding errors are countered by monitoring both the generated slave clock and the selected reference clock over a long-term measurement period, with the difference between these two cycle counts used in a feedback path to correct the output frequency. The invention's mostly-digital implementation improves its noise-rejection and suppression characteristics, and enables the system to be integrated on a common substrate.

29 Claims, 7 Drawing Sheets

SLAVE CLOCK GENERATION SYSTEM AND METHOD FOR SYNCHRONOUS TELECOMMUNICATIONS NETWORKS

BACKGROUND OF THE INVENTION

1. Field of the Invention

This invention relates to the field of synchronous telecommunications networks, and particularly to the generation of slave clocks that are synchronized to a reference clock source for use in such a network.

2. Description of the Related Art

Large telecommunications networks consist of switching engines and transmission lines. Digital networks support services whose signals may be either analog or digital in origin, with analog signals carried through a digital network by representing them as a sequence of digital words.

Two main types of digital telecommunications networks exist: circuit-switched and packet-switched. Circuit-switched networks evolved to carry real-time services, such as voice, while packet-switched networks evolved to carry data-oriented services. Until recently, separate networks were needed for circuit-switched and packet-switched architectures, and large differences were to be found in the elements of equipment used to construct them. This separation is costly in terms of equipment cost, maintenance, and operation of the networks. It has been recognized for some time that efficiencies could be realized if both types of architecture could co-exist on the same network, but a number of hurdles must first be overcome.

For many years, voice traffic has been dominant and has led the circuit-switched networks to dwarf packet-switched networks. Although non-voice services are growing rapidly, the size of the circuit-switched networks must be considered when trying to make a common network. Due to the large amount of circuit-switched equipment that is already in place, using such a network for both voice and data traffic is desirable. However, a relatively high error-rate is inherent in the make-up of circuit-switched networks, which is unsuitable to the demands of packet-based communications.

One way in which voice or data traffic can become corrupted is when samples are lost due to consecutive switches operating at slightly different rates. The rate of transmission through a first switch is determined by the speed of the switching clock provided to that switch. Similarly, the rate of consumption of signals at the input of a second switch is determined by the speed of the switching clock provided to the second switch. When the rate of consumption matches the rate of arrival, the switches operate error-free. However, when the rate of consumption differs from the rate of arrival, the switches generate errors, the cumulative effect of which can become quite large as a signal propagates through a network. Buffers can be placed on the inputs of switches to accommodate differences in transmission rates, but these introduce delays which can also have a detrimental effect on the quality of the received signal.

These difficulties make the use of circuit-switched networks to carry packets problematic. Because of the need to re-transmit packets containing errors, the throughput of a packet-switched network is significantly reduced when even a small error rate is present. Uncorrupted transmission of digital signals through and between switches depends upon the relative accuracy with which the individual switch clocks operate. To reduce error-rates in the switches, it is necessary to run the switches at the same rate. Modern communications networks typically have a hierarchal clock distribution structure to distribute a common clock to all switches. Switches can synchronize to a clock from either a higher-level switch or from a peer-level switch, if needed. Each switch is therefore a source of a clock signal for neighboring switches. Each time a clock is regenerated, the new clock is termed to be a "slave" of the clock from which it was derived (a "master" clock).

Clock distribution networks are prone to occasional failures, and keeping the network operating during an outage is a prime requirement. For this reason, the distribution network must have some degree of resilience and self-healing. Three operating modes have been identified in the various standards that govern large synchronous telecommunications networks: locked mode, holdover mode and free-running mode. These modes reflect the three stages of operation of a distribution network element. On power-up, the clock generation hardware enters the "free-running" mode. In this mode, the local slave clock is intended to be stable and close to the nominal network rate, but is not required to be synchronous. The free-running mode is usually retained until a good synchronization source is detected from a higher-level or peer-level element. The "locked mode" of operation is used when a good synchronization source has been detected, at which point the local slave clock is driven into synchronization with the incoming clock. If the synchronization source fails, the clock generator enters the "holdover mode". In this mode, the local slave clock is generated to be as close as possible to the last-known-good value of the incoming clock. This requires some stored history of the behavior of the incoming clock. Clock generation reverts to locked mode when a good synchronization source is detected.

Thus, the slave clock generator is a critical item of equipment in a clock distribution network. This system has to detect the presence and absence of synchronization sources, generating the slave clock either in synchronism with the best source, when present, or in very close approximation to it, when absent. Traditionally, the performance requirements imposed by the various telecommunications networks standards (chiefly ITU-T G.783, G.811-813, Bellcore GR-253-CORE, and ETSI 300462 (parts 1 to 6)) have been met using a voltage-controlled oscillator (VCO). The VCO is controlled by a control algorithm implemented in software and running on a microprocessor, which takes inputs from a number of sensors (e.g., temperature and voltage) and a phase comparator and generates a control voltage that causes the VCO to mimic a selected master reference source, thereby generating a slave clock.

There are several drawbacks to the use of a VCO for slave clock generation, however. Though a VCO-based system could, in principle, be integrated onto a single semiconductor substrate, its use of disparate components does not make this task easy. The operation of embedded microprocessors, instruction and data memories, and assorted other digital functions, are not compatible with the operation of sensitive analog components such as comparators and VCOs. Furthermore, the electrical noise generated by the digital components can degrade the operation of the analog components. In particular, noise appearing on the control input of a VCO leads to variations in the output frequency, otherwise known as jitter. Maximum jitter specifications for this application are typically tight, meaning that only very low levels of noise can be tolerated. Noise control is difficult when digital components are mounted close to analog components, as would be necessary with an fully integrated implementation.

Noise problems are also present in discrete VCO implementations, but precautions taken in the circuit board layout can render a design workable. However, these precautions are dependent upon various factors which are frequently out of the control of the designer of the slave clock generator. This makes each implementation unique, because the layout has to be carefully considered each time a new design is implemented. Using discrete components can also lead to unacceptable levels of space and power consumption. Finally, both discrete and integrated VCO-based systems require extensive calibration procedures needed to provide the temperature compensation necessary to meet the performance specifications. This is time-consuming and expensive.

SUMMARY OF THE INVENTION

A slave clock generation system and method are presented which are suitable for use with synchronous telecommunications networks. One or more slave clocks are generated from a selected reference clock using a direct digital synthesis technique, which greatly reduces the system's sensitivity to noise. The invention is capable of meeting very tight frequency deviation specifications, and can be integrated on a common substrate, reducing space and power consumption.

The slave clock generation system includes a multiplexer which selects a reference clock from a number of available clock signals, each of which can be at its own spot frequency. Toggle detectors preferably monitor each of the available clock sources, and block the selection of any that are not within a specified frequency range. A local oscillator is used to establish a "short-term measurement period"; the cycles of the selected reference clock are counted over consecutive short-term measurement periods to determine the relative frequency of the selected clock with respect to the frequency of the local oscillator. The cycle counts are fed to a phase-to-clock converter, which produces a slave clock output having a frequency that varies with the relative frequency measured for the selected clock.

Rounding errors which can introduce inaccuracies into the frequency of the slave clock are countered by monitoring both the generated slave clock and the selected reference clock over a "long-term measurement period", which is also established by the local oscillator. The difference between these two cycle counts is used in a feedback path to correct the output frequency.

The invention is capable of operating in locked, holdover, and free-running modes, and is capable of meeting the frequency deviation specifications given for each mode. In locked mode, a deviation of 3 parts per billion or less is maintained, while a drift of less than 4.6 parts per million per month is achieved in holdover mode. The invention does not require a local microprocessor, and its mostly-digital implementation enables it to be integrated on a common substrate, realizing both space and power consumption advantages. The mostly-digital implementation also greatly reduces the adverse affects of noise, whether generated on-chip or elsewhere on the printed circuit board (PCB) to which the chip is mounted.

Further features and advantages of the invention will be apparent to those skilled in the art from the following detailed description, taken together with the accompanying drawings.

DETAILED DESCRIPTION OF THE INVENTION

Figure 1:
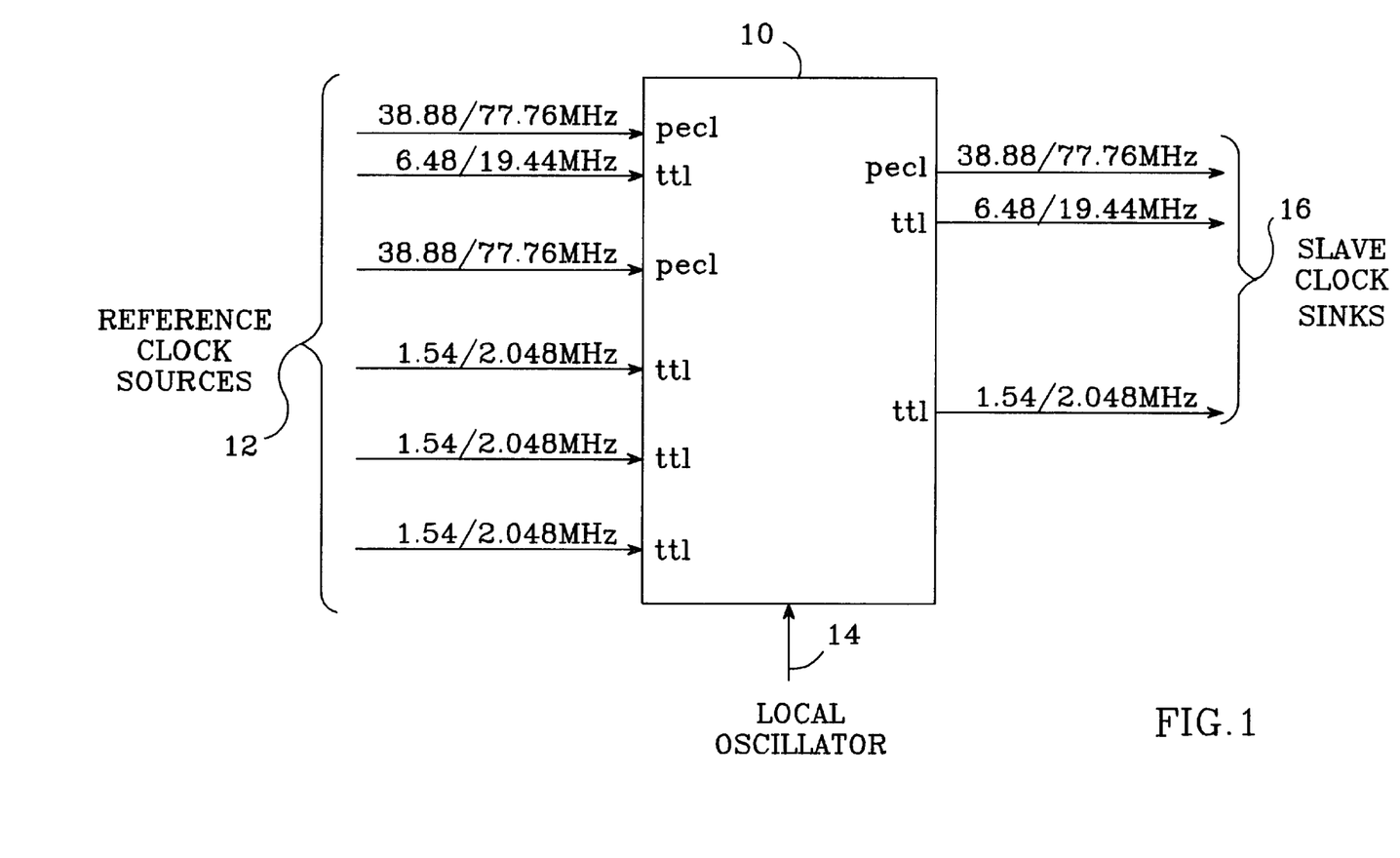
FIG. 1 is a diagram illustrating the context in which a slave clock generator per the present invention is used.

A slave clock generator 10 per the present invention is shown in FIG. 1. A number of reference clock sources (or "master" clocks) 12 are typically available from which one or more slave clocks can be generated. The reference sources are supplied by, for example, the clock recovery circuits of high-speed and low-speed line interfaces and a port on a local synchronous distribution network. Many reference sources offer two selectable frequencies (such as 38.88 MHZ or 77.76 MHZ, 6.48 MHZ or 19.44 MHZ, or 1.54 MHZ or 2.048 MHZ), with the selection performed by network management components that are outside the scope of this patent. The reference sources may be generated by components from a variety of logic families, such as positive ecl (pecl) or ttl, and for maximum flexibility, slave clock generator 10 is preferably arranged to support each possibility. The slave clock generator shown in FIG. 1 is arranged to receive a maximum of six reference sources as inputs, though the invention is not limited to any particular maximum input count.

Slave clock generator 10 also receives a local oscillator clock 14 as an input. One of the reference sources is selected to be the source from which one or more slave clocks are to be generated. By using direct digital synthesis techniques (described in detail below), the slave clock generator produces one or more slave clock outputs 16 which are derived from the selected reference source. Again, for purposes of maximum flexibility, the slave clock generator preferably offers several slave clock outputs having different frequencies, which oscillate between the high and low logic levels of a variety of logic families. The slave clock generator 10 may also be arranged to offer selectable frequencies on each output. The slave clocks generated by the generator may be used by any number of device-types (i.e., "slave clock sinks"), such as line drivers or switches.

The reference source frequencies shown in FIG. 1 are merely exemplary; the invention is adaptable for use with reference sources having a wide range of frequencies, as long as the local oscillator frequency, as used on-chip (i.e., as used by those slave clock generator components which may be integrated together on a common substrate, discussed in more detail below), is made high enough to accommodate them. For cost and complexity reasons (e.g., it must be very well temperature-compensated), the local oscillator is preferably off-chip, and supplies its clock to the chip at a moderate frequency that is lower than that actually required on-chip. A clock multiplier 25, preferably an on-chip analog phase-locked loop (PLL) circuit, is then used to multiply up the frequency of the supplied local oscillator clock to obtain a high-speed clock for use on-chip. To generate a slave clock that closely tracks a reference source using direct digital synthesis requires a local oscillator having a frequency that is greater than that of the selected reference source; a local oscillator frequency at least 2 times greater than that of the highest frequency of the selected reference source is required, and higher ratios are preferred.

Figure 2:
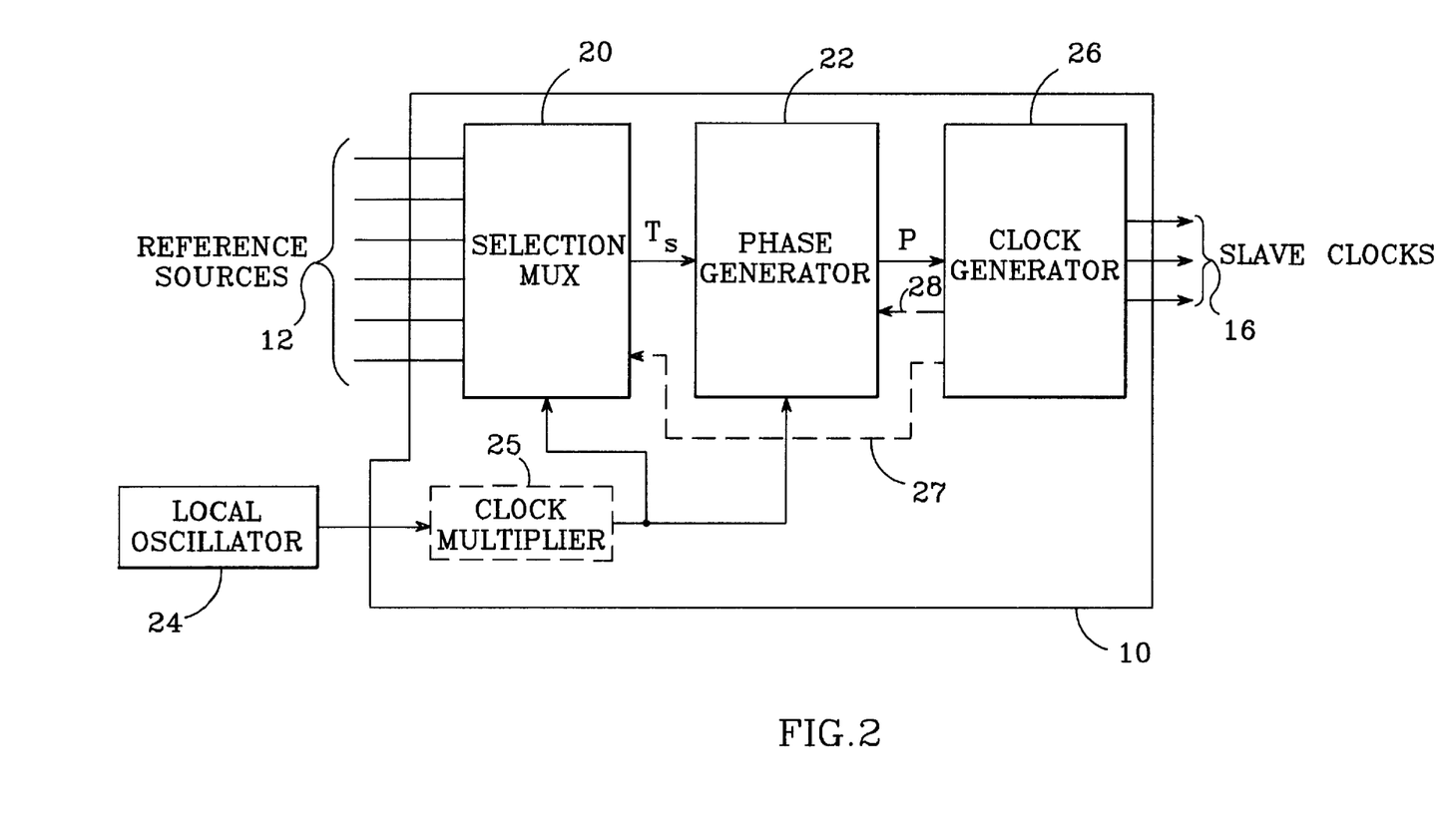
FIG. 2 is a block diagram illustrating the basic components of a slave clock generator per the present invention.

A block diagram illustrating the basic components of slave clock generator 10 is shown in FIG. 2. The reference sources 12 are received by a selection multiplexer 20, which selects one of the reference sources to be the clock $T_s$ from which the slave clocks are derived. The selection is made under the control of external network management components, which establish a preferred selection order. The selection multiplexer preferably also includes the capability to monitor the frequency of each of the reference sources, in which case the multiplexer receives the output of a local oscillator 24 (shown multiplied up with clock multiplier 25 for use on-chip, as discussed above) as a reference; if a source is outside of a predetermined range, the source is "de-selected". A source is de-selected if the system blocks it from being selected at all, or if, after having already been selected, the frequency of the source is detected to have fallen outside the predetermined range. In the latter case, the selection multiplexer selects the next source in accordance with the selection order. The de-selection process is discussed in more detail below.

The selected reference source $T_s$ is fed to a phase generator 22, which also receives the (multiplied up) output of local oscillator 24. The phase generator produces a phase value P (discussed in detail below), which is a measure of the relative frequency of selected source $T_s$ with respect to the frequency of the local oscillator. Phase value P is fed to a clock generator 26, which decodes the P value and generates one or more slave clocks 16 in accordance with the P value. The P value is periodically updated so that it accurately represents the frequency of the selected source $T_s$; in turn, the frequency of the slave clocks closely tracks that of the selected reference source. A feedback signal 27 is preferably fed back to the selection multiplexer 20, and one of the slave clock outputs 16 is fed back via line 28 to phase generator 22—the purposes for these feedback signals is described below. Multipliers and dividers can be employed as needed to enable a range of slave clocks to be generated from the selected reference source.

Figure 3:
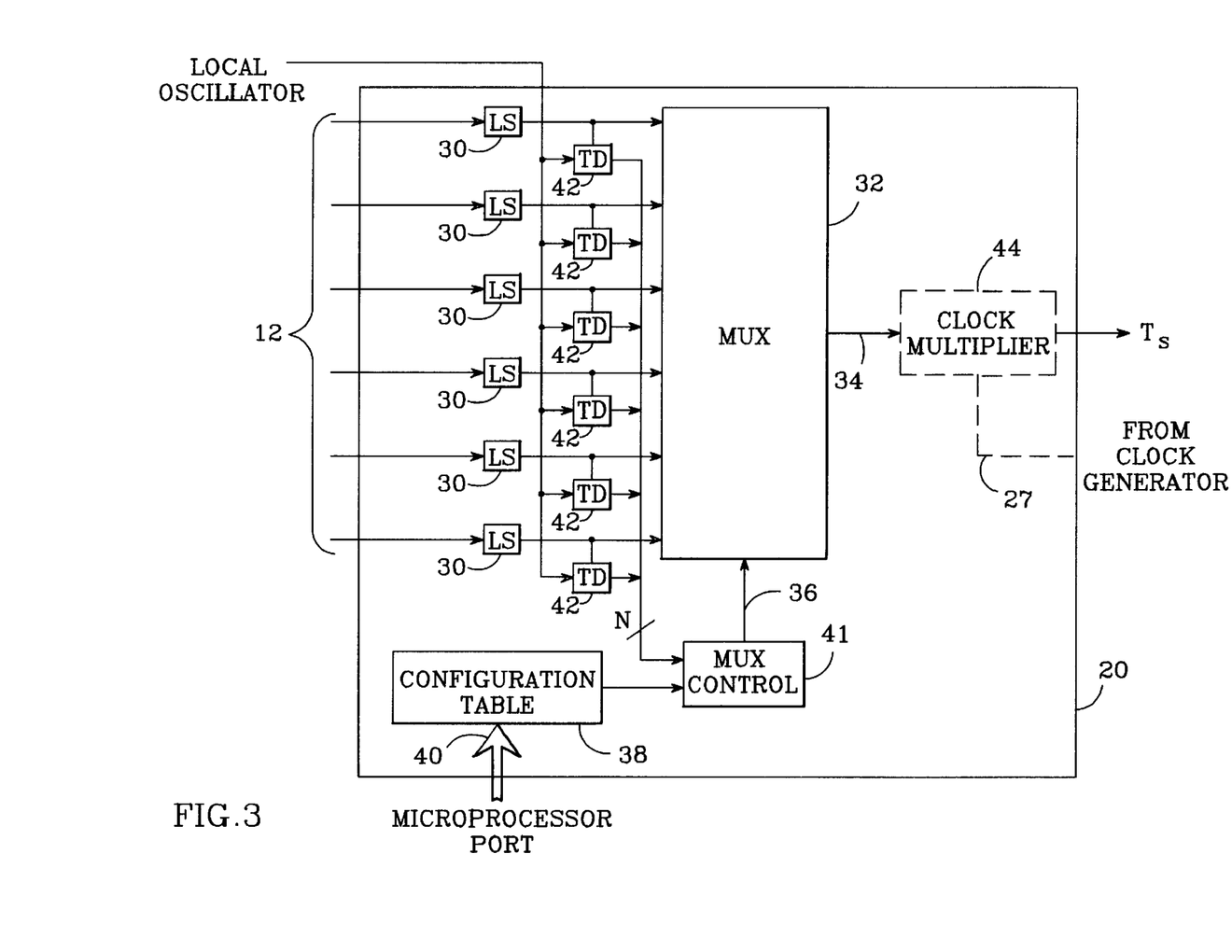
FIG. 3 is a block diagram of an exemplary embodiment of a selection multiplexer per the present invention.

A block diagram illustrating an exemplary embodiment of selection multiplexer 20 is shown in FIG. 3. If necessary, the N reference sources 12 are passed through level shifters 30 to ensure that they share common logic levels. The reference sources are then fed to a conventional 1 of N multiplexer 32, which connects one of the reference sources to an output 34 in accordance with a control signal received at a control input 36.

The determination of which reference source to select must take into account the operational availability of each source, as well as a number of factors that are external to the invention—such as the wishes of the network planners and the topology of the network. These external factors are preferably accommodated via the loading of a configuration table 38 with a preferred order of priority for selecting the incoming sources. The selection order priority is preferably loaded into table 38 from an external microprocessor (not shown) via a port 40. The configuration table produces an output to a multiplexer control circuit 41, which conveys the reference source selection to multiplexer 32 via control input 36.

The operational availability of each of the N sources is preferably monitored by respective toggle detectors 42. The N toggle detectors are each supplied with a clock derived from the local oscillator, which they use to determine the frequency of their respective reference sources. Each of the toggle detectors monitors its respective source to determine whether its frequency is within a specified range, as well as for intermittent behavior. The toggle detectors report reference source status to multiplexer control circuit 41. Any reference source that does not meet the required standards is blocked from selection. If an out-of-tolerance reference source is currently selected, multiplexer control circuit 41 automatically selects a different source in accordance with the configuration table, and blocks the failed source from being reselected. In this way, the best reference source (as determined by the predetermined priority order and the sources' operational availability) is always selected. The status of each source may be stored in a register which is readable by the external microprocessor. The output 34 of multiplexer 32 may be fed to a clock multiplier circuit 44, preferably a digital PLL, which produces clock $T_s$ from which slave clocks will be generated. The multiplier circuit is useful to ensure that $T_s$ always oscillates at the same nominal frequency, regardless of the frequency of the selected reference source. Clock multiplier 44 also preferably receives feedback signal 27 from clock generator 26, the purpose of which is described below.

Figure 4:
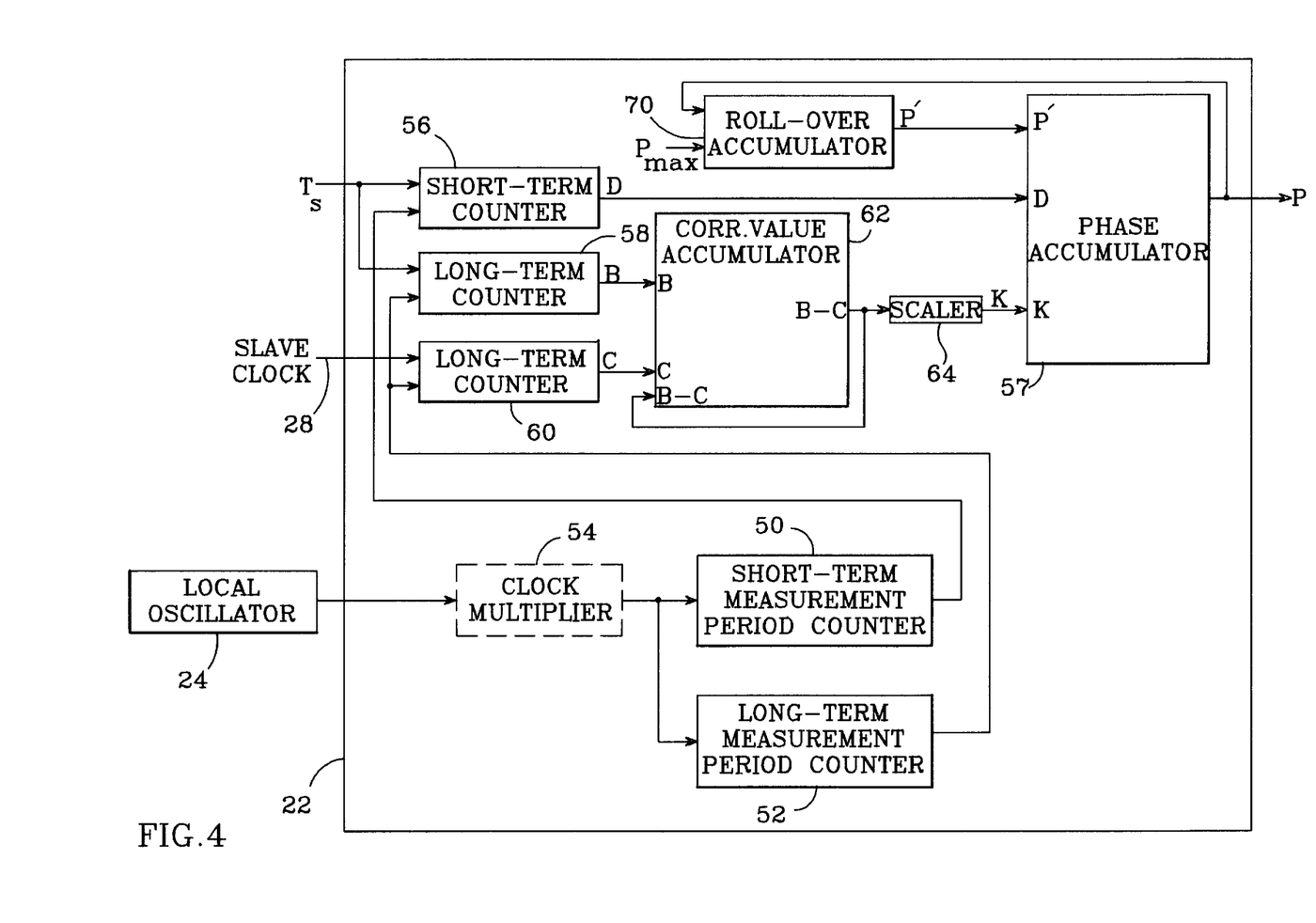
FIG. 4 is a block diagram of an exemplary embodiment of a phase generator per the present invention.

The slave clock generator uses a direct digital synthesis technique to generate the slave clocks; this technique involves the use of phase and clock generators as discussed below. A block diagram illustrating an exemplary embodiment of phase generator 22 is shown in FIG. 4. The local oscillator 24 (multiplied up as necessary) is used to establish a short-term measurement period and a long-term measurement period, preferably using a pair of counters 50 and 52, respectively, which are arranged to divide down the local oscillator frequency by respective amounts to produce the desired short and long-term measurement periods. If necessary to provide accurate measurement periods, the local oscillator frequency can be multiplied with clock multiplier 54—implemented with an analog PLL circuit, for example—prior to its being divided down. Though the measurement periods are implemented with a pair of counters in FIG. 4, the invention is not limited to this implementation. Other means by which a well-known and repeatable measurement period can be generated may also be employed.

The selected reference clock $T_s$ is fed to a short-term counter 56, which is arranged to count the cycles of clock $T_s$ that occur during the short-term measurement period. This technique measures the relative frequency of the selected clock with respect to that of the local oscillator. An absolute measurement of the frequency of selected clock $T_s$ is not required because the local oscillator is used again in the generation of the slave clock, so that any permanent offsets in the frequency of the local oscillator are canceled out. The number of cycles counted by short-term counter 56 during a short-term measurement period is output as a value D. Short-term measurement periods are generated periodically (i.e., one right after another at fixed intervals), so that the D value is periodically updated so that it always reflects the recent history of clock $T_s$.

The duration of the short-term measurement period is application-dependent, selected to enable effective tracking of the selected clock's jitter and wander components. For example, a short-term measurement period of 50 ms permits the circuit to track wander components of up to 20 Hz, while a measurement period of 500 ms enables the tracking of wander frequencies below 2 Hz. The flexibility hereby afforded permits the circuit to be used in a wide range of applications.

In between updates of the D value, the present D value is used to generate a phase-base by continually adding the D value to an accumulated phase value P, at a rate of one addition for every cycle of the local oscillator; this is accomplished with a phase accumulator 57. The ongoing phase value P is a piecewise-linear approximation of a linear phase increase. The P value is decoded by clock generator 26 to produce the slave clock.

Inaccuracies in the slave clock can be caused by "rounding errors" in the D count. Rounding errors are inevitable when two clock domains are involved, because there is always the possibility that metastability will occur which affects the incrementing of the count at the end of the measurement period. A special handshaking technique can be employed to prevent such metastability from affecting the beginning of the measurement period, but handshaking can only improve the operation at one end or the other of the measurement period—not at both ends. Rounding errors can cause the D count to be in error by several parts per million, resulting in a slave clock frequency offset of the same order. This can be several orders of magnitude greater than that required by the applicable standards (which can be as low as 3 parts per billion).

Inaccuracies in the slave clock due to rounding errors are combated by detecting differences between the selected clock and one of the generated slave clocks using two additional counters 58 and 60, which operate over a longer time period so that the impact of rounding errors is diminished to an acceptable level. As shown in FIG. 4, long-term counters 58 and 60 are arranged to count the cycles of selected clock $T_s$ and of a generated slave clock, respectively, which occur during the long-term measurement period established by the local oscillator. The number of cycles counted by long-term counters 58 and 60 during a long-term measurement period are output as a value B and a value C, respectively. The slave clock generator is typically configured to provide a number of slave clocks having a variety of frequencies; as such, the slave clock 28 which is fed to counter 60 is preferably one that is at the same frequency as $T_s$, to simplify the comparison between the B and C values.

The duration of the long-term measurement period is also application-dependent, chosen so that the effect of any rounding errors in the long-term counts are not so great as to permit the slave clock frequency to be pushed outside of its specified limits. The handshaking technique mentioned above can also be employed to improve the accuracy of these counts, as well as to reduce the length of the long-term measurement period.

Cycle count values B and C are fed to a correction value accumulator 62, which computes the difference between them (B−C). This difference value serves as a correction vector, which is fed to the phase accumulator 57 to correct for errors in the D value. Because the B and C values are much larger than the D value (due to the much longer measurement period), the difference value is preferably scaled down with a scaler 64 to suit the sensitivity of the phase accumulator; the output of scaler 64 is a value K, which is given by (B−C) divided by a scaling factor established by scaler 64. The scaling factor is selected to serve two primary purposes: it shifts the B−C result down until the most-significant bits of the result carry the same weight as the most-significant bits of the D value, and it bleeds the lower-significance bits into the accumulator in a smooth way. Because there is a long-term measurement period between updates of the difference value, the error which it corrects may be present in the generated slave clock for several seconds. However, the governing standards typically permit this brief period of error.

Figure 5:
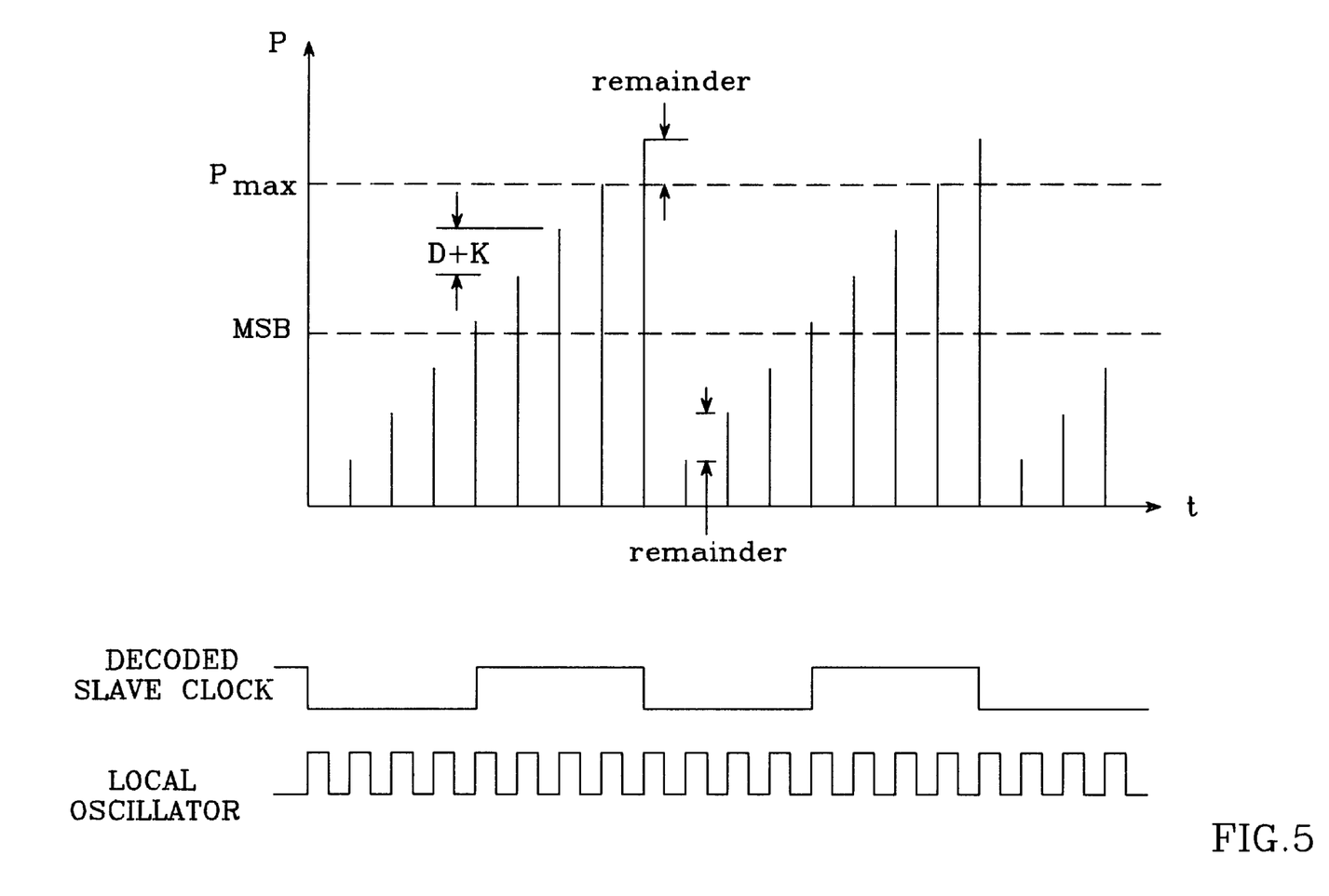
FIG. 5 is a plot and two waveforms illustrating the operation of a phase accumulator used within a phase generator per the present invention.

The operation of the phase accumulator is illustrated in FIG. 5, which plots phase value P over time. Phase accumulator 57 keeps an ongoing total of D and K values, repetitively adding the current D and K values to the current total of all the previous D and K values until "roll-over" occurs; i.e., when the cumulative total exceeds a maximum value $P_{max}$. The P value is updated once per cycle of the local oscillator, the waveform of which is shown below the graph. As a result, P increases in a stair-step fashion, with each step being equal to its respective D+K value. P takes the form of a binary value; in this example, the clock generator is arranged to toggle the slave clock (shown below the graph) when the most-significant-bit (MSB) of the P value changes state, and when the P value exceeds $P_{max}$.

Referring back to FIG. 4, an ongoing P total is maintained by connecting phase accumulator 57 to a roll-over accumulator 70. Roll-over accumulator 70 receives the current P value at one input and the $P_{max}$ value at a second input, and produces an output P' which is fed to an input of phase accumulator 57. When P is less than $P_{max}$, roll-over accumulator 70 sets P'=P. However, when the P value exceeds $P_{max}$, roll-over accumulator 70 subtracts P from $P_{max}$ to determine a "remainder" value, and P' is set equal to this remainder.

Phase accumulator 57 is arranged to produce a phase value P that is given by:

$$P=P'+D+K,$$

where K is given by:

$$K=(B-C)/\text{scaling factor},$$

where the scaling factor is established by scaler 64 as discussed above. When the remainder value is summed into phase accumulator 57 as described above, it is used as the starting value of the next cycle.

Figure 6:
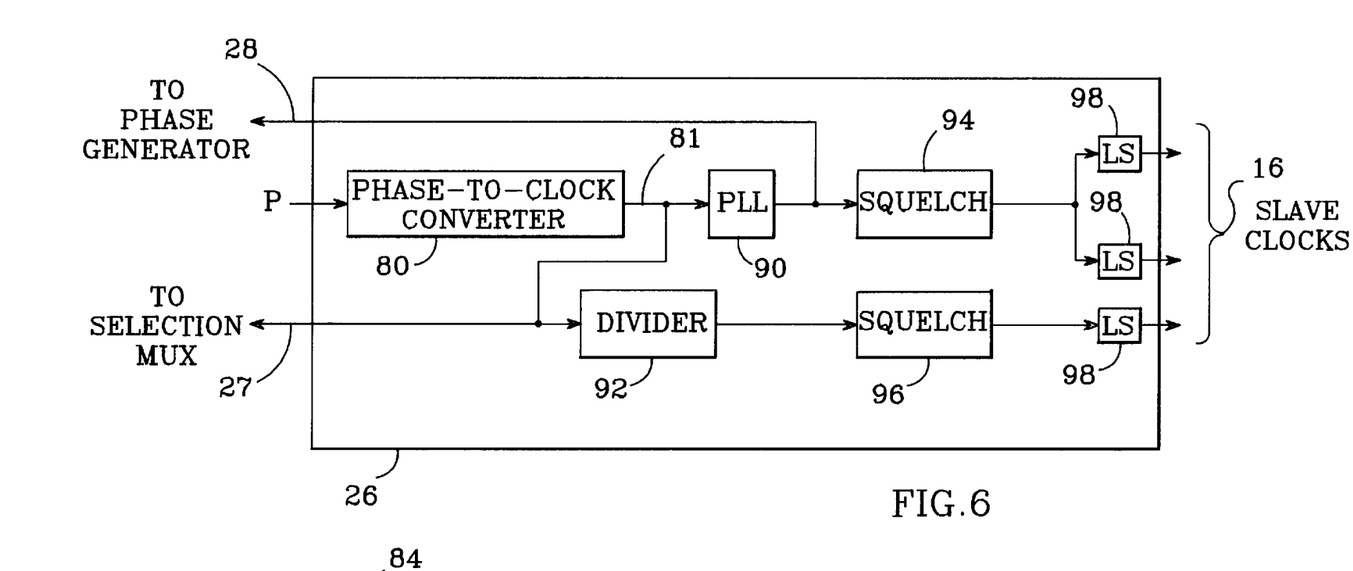
FIG. 6 is a block diagram of an exemplary embodiment of a clock generator per the present invention.
Figure 7A:
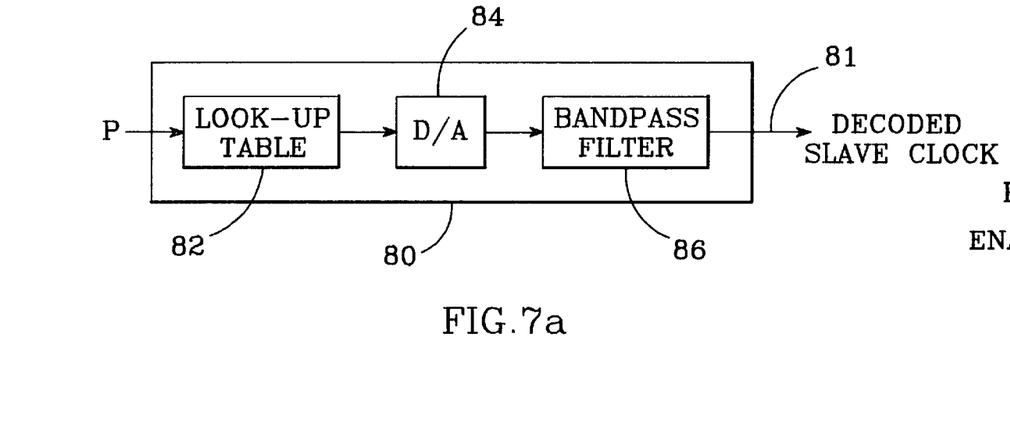
FIGS. 7a and 7b are two possible embodiments of a phase-to-clock converter used within a clock generator per the present invention.
Figure 7B:
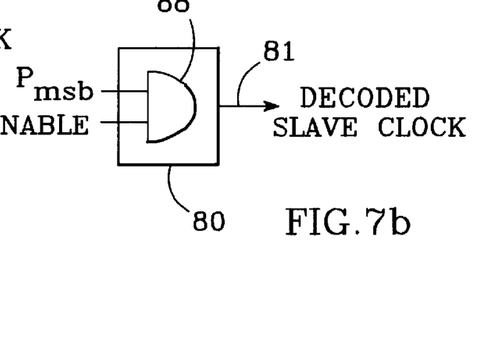

The P value produced by phase accumulator 57 is fed to clock generator 26, an exemplary embodiment of which is shown in FIG. 6. P is decoded with a phase-to-clock converter 80, which produces a decoded slave clock output waveform 81 having a frequency that varies with phase value P. There are many possible implementations of phase-to-clock converter 80, two of which are shown in FIGS. 7a and 7b. In FIG. 7a, the P value is applied to a look-up table 82, which outputs digital words corresponding to portions of a sinewave in response to the changing P value. The look-up table output is fed to a digital-to-analog (D/A) converter 84 to produce a clock waveform, which is passed through a bandpass filter 86 to improve the quality of the clock waveform.

Another possible phase-to-clock converter 80 is shown in FIG. 7b, consisting of a single AND gate 88. In this example, the AND gate is connected to the MSB of the P value, and to an ENABLE signal. When ENABLE is high and the P value's MSB toggles high, the output of the AND gate—and of the decoded slave clock waveform—also go high. This implementation produces a simple square wave output, which does not require the use of a bandpass filter.

Referring back to FIG. 6, the output of phase-to-clock converter 80 is preferably fed to an analog PLL circuit 90. The PLL acts to attenuate any jitter that is present in the decoded slave clock, and can be programmed to multiply or divide the decoded output to produce a slave clock having a specific frequency. Additional slave clock frequencies can be derived from the decoded slave clock output with additional divider circuits, as exemplified by divider 92 in FIG. 6. Squelch circuits 94 and 96, preferably implemented with AND gates, can be inserted in series with each slave clock output to kill their respective clocks, which can be used to indicate the occurrence of a failure in the clock generation process to downstream equipment. Level shifters 98 can also be inserted in series with the slave clock outputs, when needed to match the logic levels of a generated slave clock with those required by the slave clock's sink.

The decoded slave clock serves as feedback signal 27, which is connected back to the clock multiplier 44 of selection multiplexer 20. This feedback path is used to allow the clock multiplier to align selected clock $T_s$ with the selected reference source. This is made possible by requiring all input and output clocks to be multiples of a particular frequency, such as 8 kHz. Then, the 8 kHz fundamental of clock $T_s$ is aligned with that of the selected reference source clock. The short-term measurement period (and, indirectly, the long-term measurement period) are then aligned with $T_s$. One of the slave clock outputs 28 is also fed back from clock generator 26 to phase generator 22, where it is monitored with long-term counter 60.

The slave clock generator is preferably arranged to temporarily enter holdover mode when a different reference source is selected. A state machine, included as part of multiplexer control circuit 41, takes inputs from the toggle detectors, the configuration table 38 and a control register, is accessed for reading and writing via the microprocessor port, and determines the operating mode. When a selected reference source has to be de-selected, the state machine causes the holdover mode to be entered until an alternative reference source has been declared available; the state machine then selects the new reference source as $T_s$, waits for the 8 kHz fundamental of the output signal to become aligned to that of the new reference source, and then enters the locked mode. The holdover mode operates using the history of the measured frequency of the previous selected reference source to continue to generate the slave clock, without causing errors in the output. Holdover mode is cleared when the selection of a new reference source is complete. The use of the holdover mode during a switchover ensures a smooth transition from one clock source to another. Holdover mode can also be invoked and canceled by the external microprocessor.

The slave clock generator is preferably arranged to enter the free-running mode immediately following power-up, with the state machine within multiplexer control circuit 41 (described above) controlling the mode selection. Direct digital synthesis is used to generate the slave clock, but the clock's frequency is determined by a stored value which is typically calculated and stored during initial system test. Free-running mode can also be invoked and canceled by the external microprocessor.

Because the local oscillator is used to monitor the reference source and slave clocks, and to generate the slave clocks, drifts in the frequency of the local oscillator do not affect the long-term accuracy of the slave clock frequency during locked mode. Drifts in the frequency of the local oscillator during free-running and holdover modes, however, do affect the accuracy of the slave clock frequency. Local oscillators with good temperature compensation and low aging coefficients, such as might be provided by a temperature-compensated crystal oscillator, are preferred. A local oscillator which can be integrated onto the same semiconductor substrate as the rest of the slave clock generator is preferred if a higher level of integration is desired.

Figure 8:
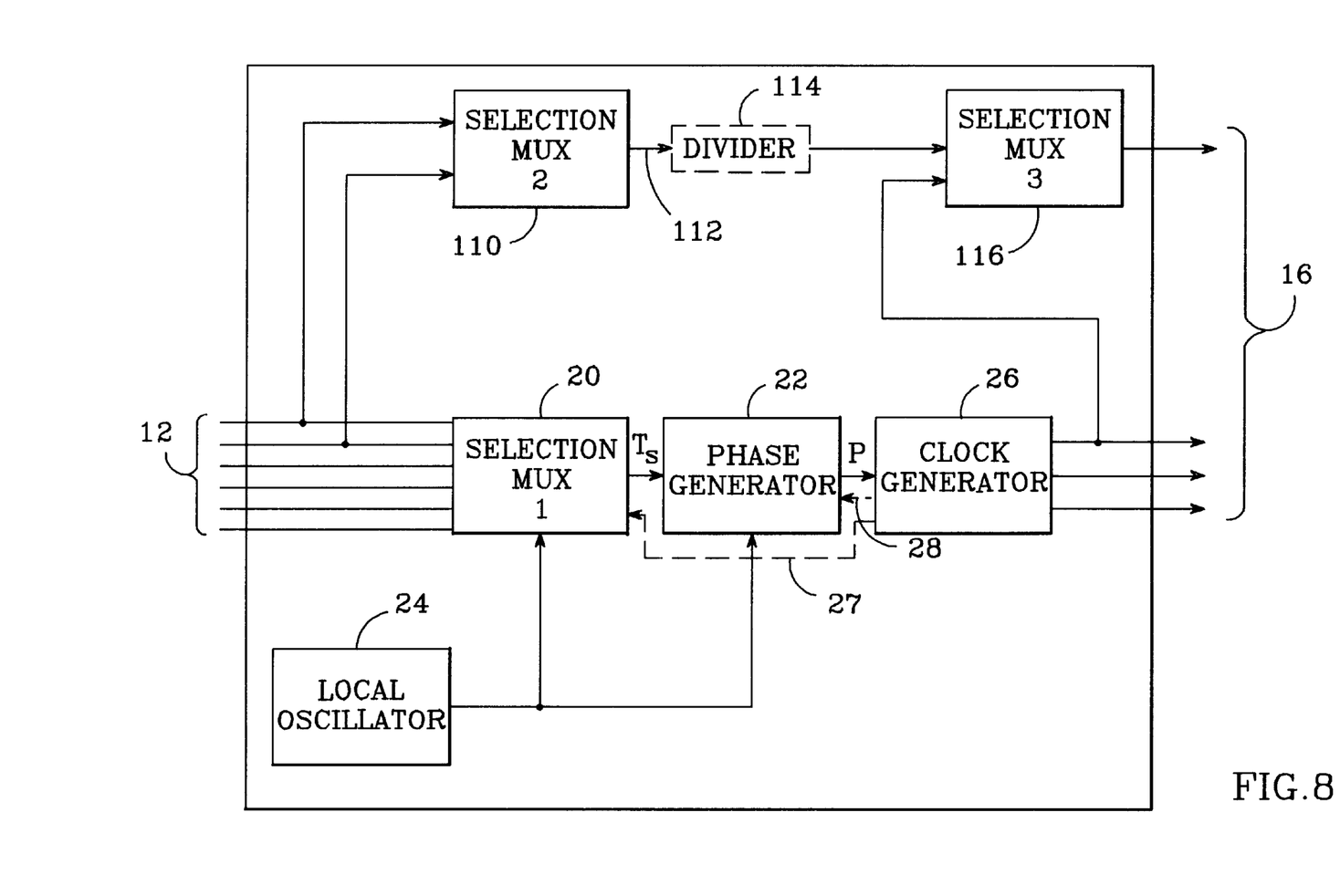
FIG. 8 is a block diagram of an alternative embodiment of a slave clock generator per the present invention.

A more flexible implementation of a slave clock generator per the present invention is shown in the block diagram of FIG. 8. Before, each slave clock output was derived from $T_s$, with the decoded slave clock multiplied or divided as necessary. Here, one or more slave clocks can be derived from one of the reference sources 12. A selection multiplexer 110 (SELECTION MUX 2) receives two or more reference sources. Multiplexer 110 is directed to select one of the reference sources, preferably under the control of an external microprocessor, which is passed on to its output 112. A divider 114 may be provided in series with the multiplexer output if a lower frequency slave clock is needed. A selection multiplexer 116 (SELECTION MUX 3) receives the output of multiplexer 112 and a slave clock derived from $T_s$ as inputs, and is directed to select one or the other to be output as a slave clock.

Because the components of slave clock generator 10 are mostly digital circuits (i.e., the generator is all-digital except for the analog PLLs and the off-chip local oscillator), the invention's noise-rejecting and noise-suppressing characteristics are improved when compared with mostly-analog prior art systems such as the VCO design discussed above. Sensitivity to board layout is also reduced, making it much easier to use the generator in practice.

The mostly-digital implementation also enables the slave clock generator, i.e., everything contained within box 10 in FIG. 2, to be integrated onto a common substrate, deriving further benefits in terms of cost reduction and reduced power consumption. The invention requires no local microprocessor for its operation (though an external microprocessor is typically used to provide network management functions). All of these advantages combine to make the present invention eminently suitable for use in a modern synchronous telecommunications network.

While particular embodiments of the invention have been shown and described, numerous variations and alternate embodiments will occur to those skilled in the art. Accordingly, it is intended that the invention be limited only in terms of the appended claims.

We claim:

1. A slave clock generator suitable for generating a clock signal that is synchronized with a selected one of a number of incoming reference clock sources and is suitable for use in a synchronous telecommunications network, comprising:

a selection multiplexer for selecting a reference clock from among a plurality of incoming reference clock sources;

a local oscillator which generates an output having a frequency greater than that of any of said incoming reference clock sources;

a phase generator which produces an output that varies with the relative frequency of said selected reference clock measured with respect to said local oscillator frequency; and a clock generator which generates a slave clock having a frequency that varies with said relative frequency.

2. The slave clock generator of claim 1, further comprising a plurality of toggle detectors connected to respective ones of said reference clock sources, each of said toggle detectors arranged to monitor the frequency of its respective reference clock source, said selection multiplexer arranged such that a reference clock source having a frequency that is outside of a predetermined range is de-selected as said selected reference clock.

3. The slave clock generator of claim 1, wherein said phase generator is further arranged to monitor the respective frequencies of said selected reference clock and said generated slave clock over a long-term measurement period, and to use the difference between said monitored frequencies to modify said phase generator's output to correct for rounding errors which produce inaccuracies in said slave clock frequency.

4. The slave clock generator of claim 3, further comprising a phase accumulator which receives said output that varies with the relative frequency of said selected reference clock and signals representing the respective frequencies of said selected reference clock and said generated slave clock over a long-term measurement period as inputs, and is arranged to combine said inputs and provide an output to said clock generator to generate said slave clock having a frequency that varies with said relative frequency.

5. The slave clock generator of claim 1, wherein said selection multiplexer, said phase generator and said clock generator are integrated together on a common substrate.

6. The slave clock generator of claim 1, wherein said selection multiplexer, said phase generator and said clock generator are mostly-digital circuits, the use of said mostly-digital circuits tending to reduce the noise sensitivity of said slave clock generator when compared with equivalent mostly-analog circuits.

7. The slave clock generator of claim 1, wherein said plurality of incoming reference clock sources have respective spot frequencies.

8. A slave clock generator for generating a slave clock which is synchronized with a selected one of a number of incoming reference clock sources and is suitable for use in a synchronous telecommunications network, comprising:
    a selection multiplexer for selecting a reference clock from among a plurality of reference clock sources;
    a phase generator, comprising:
        a local oscillator,
        first and second counters arranged to divide down the output frequency of said local oscillator to provide short-term and long-term measurement periods, respectively,
        a third counter arranged to count the cycles of said selected reference clock which occur during said short-term measurement period and to output said cycle count, said cycle count having a value D,
        a fourth counter arranged to count the cycles of said selected reference clock which occur during said long-term measurement period and to output said cycle count, said cycle count having a value B,
        a fifth counter arranged to count the cycles of a slave clock output produced by said slave clock generator which occur during said long-term measurement period and to output said cycle count, said cycle count having a value C,
        a phase accumulator arranged to receive said cycle count values B, C and D and to produce a phase value P based on said B, C and D values which represents the frequency of said selected reference clock and which is updated once for each cycle of said local oscillator; and
    a clock generator which produces said slave clock output in accordance with the value of said phase value P; the use of said B and C values correcting for rounding errors which produce inaccuracies in said slave clock frequency.

9. The slave clock generator of claim 8, wherein said phase generator further comprises a correction value accumulator, a roll-over accumulator and a scaler, said correction value accumulator computing the difference between said B value and said C value (B−C), said scaler connected to divide said (B−C) result by a predetermined scaling factor selected to make the most-significant bits (MSBs) of the (B−C) result carry the same weight as the MSBs of the D value, said roll-over accumulator connected to deliver an output P' to said phase accumulator and arranged such that P' is equal to the value taken by phase value P during the previous cycle of said local oscillator unless P has exceeded a maximum value $P_{max}$, in which case P'=P−$P_{max}$, said phase accumulator arranged to compute said phase value P in accordance with:

$$P=P'+D+K,$$

where K=(B−C) divided by said scaling factor.

10. The slave clock generator of claim 8, wherein said selection multiplexer, said phase generator and said clock generator are integrated together on a common substrate.

11. The slave clock generator of claim 8, wherein said selection multiplexer, said phase generator and said clock generator are each mostly-digital circuits, the use of said mostly-digital circuits tending to reduce the noise sensitivity of said slave clock generator when compared with equivalent mostly-analog circuits.

12. The slave clock generator of claim 8, wherein said plurality of incoming reference clock sources have respective spot frequencies.

13. The slave clock generator of claim 8, said slave clock generator being in a locked mode when said slave clock output is being derived from a periodically-updated value of phase value P, the output frequency of said slave clock tracking that of said selected reference clock to within 3 parts per billion when said slave clock generator is in said locked mode.

14. The slave clock generator of claim 8, further comprising a plurality of toggle detectors connected to respective ones of said reference clock sources, each of said toggle detectors arranged to detect when the frequency of its respective reference clock source is outside of a predetermined range, said selection multiplexer arranged to de-select a reference clock source having a frequency that is detected to be outside of said predetermined range.

15. The slave clock generator of claim 14, said slave clock generator arranged to enter a holdover mode when said selection multiplexer is selecting a different reference clock source as said selected reference clock, said slave clock generator when in said holdover mode using the history of said D value measured for the previously selected reference clock to continue to generate the slave clock, the output frequency of said slave clock tracking that of said selected reference clock to within 4.6 parts per million per month when said slave clock generator is in said holdover mode.

16. The slave clock generator of claim 8, wherein said clock generator includes a look-up table which stores respective digital output words for a plurality of possible P values and a digital-to-analog (D/A) converter, and is arranged to receive the phase value P from said phase accumulator and to provide the digital output word corresponding to said P value to said D/A converter in accordance with said look-up table, said look-up table arranged such that said D/A converter generates a portion of the waveform of said slave clock output in response.

17. The slave clock generator of claim 16, wherein said clock generator includes a bandpass filter for filtering the waveform produced by said D/A converter.

18. The slave clock generator of claim 17, further comprising a phase-locked loop (PLL) circuit connected to the output of said bandpass filter, said PLL circuit attenuating jitter which may be present in said slave clock output waveform and multiplying the frequency of said slave clock output as needed to obtain a desired slave clock output frequency.

19. The slave clock generator of claim 8, wherein said clock generator further comprises a phase-locked loop (PLL) circuit connected to receive the most-significant-bit (MSB) of said P value as an input, said PLL circuit attenuating jitter which may be present in said MSB signal and multiplying the frequency of said MSB signal to obtain a desired slave clock output frequency.

20. The slave clock generator of claim 19, said clock generator further comprising an AND gate, one input of said AND gate connected to said MSB signal and said AND gate's output connected to said PLL circuit input, said AND gate conveying said MSB signal to said PLL circuit input when each of its other inputs is high.

21. A method of generating a slave clock which is synchronized with one of a number of available reference clock sources and is suitable for use in a synchronous telecommunications network, comprising:

selecting a reference clock to which a slave clock is to be synchronized from among a plurality of reference clock sources;

determining the relative frequency of said selected reference clock with respect to the frequency of a local oscillator; and generating a slave clock having a frequency based on the relative frequency of said selected reference clock, said slave clock frequency about equal to that of said selected reference clock.

22. The method of claim 21, further comprising the steps of dividing down the frequency of said local oscillator to establish a short-term measurement period and of counting the cycles of said selected reference clock that occur during one of said short-term measurement periods, said count of cycles determining said relative frequency.

23. The method of claim 21, further comprising the steps of dividing down the frequency of said local oscillator to establish a long-term measurement period, determining the difference in the number of cycles of said selected reference clock and said slave clock that occur during one of said long-term measurement periods, and of adjusting the frequency of said slave clock in accordance with said difference to correct for rounding errors which produce inaccuracies in said slave clock frequency.

24. The method of claim 21, further comprising the steps of monitoring the frequency of each of said plurality of reference clock sources and of de-selecting any of said reference clock sources having a frequency that is not within a predetermined range.

25. The method of claim 21, wherein said step of generating a slave clock having a frequency based on the relative frequency of said selected reference clock is accomplished by inputting said relative frequency into a lookup table and feeding the digital word produced by said table to a digital-to-analog (D/A) converter, the output of said D/A converter forming a portion of said slave clock output waveform.

26. The method of claim 25, further comprising the step of bandpass filtering the output of said D/A converter.

27. The method of claim 25, further comprising the step of jitter filtering the output of said D/A converter.

28. The method of claim 25, further comprising the step of multiplying the output frequency of said D/A converter to obtain a desired slave clock output frequency.

29. The method of claim 25, further comprising the steps of jitter filtering the output of said D/A converter and multiplying the output frequency of said D/A converter to obtain a desired slave clock output frequency, said jitter filtering and said multiplying accomplished with a phase-locked loop circuit (PLL).

* * * * *